US008364470B2

(12) United States Patent
Abraham et al.

(10) Patent No.: US 8,364,470 B2
(45) Date of Patent: Jan. 29, 2013

(54) TEXT ANALYSIS METHOD FOR FINDING ACRONYMS

(75) Inventors: Stefan Abraham, Boeblingen (DE); Christoph Lingenfelder, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 12/350,586

(22) Filed: Jan. 8, 2009

(65) Prior Publication Data

US 2009/0182554 A1    Jul. 16, 2009

(30) Foreign Application Priority Data

Jan. 15, 2008   (EP) ..................................... 08100479

(51) Int. Cl.
G06F 17/27    (2006.01)
(52) U.S. Cl. ............................................. 704/9; 704/10
(58) Field of Classification Search .................. 704/9–10
See application file for complete search history.

(56) References Cited

U.S. PATENT DOCUMENTS

| | | | | | |
|---|---|---|---|---|---|
| 5,161,105 | A | * | 11/1992 | Kugimiya et al. .................. | 704/4 |
| 5,634,084 | A | * | 5/1997 | Malsheen et al. .............. | 704/260 |
| 6,279,018 | B1 | * | 8/2001 | Kudrolli et al. ................ | 715/234 |
| 7,809,719 | B2 | * | 10/2010 | Furuuchi et al. ............... | 707/723 |
| 7,848,918 | B2 | * | 12/2010 | Li et al. .............................. | 704/9 |
| 7,925,498 | B1 | * | 4/2011 | Baker et al. ......................... | 704/9 |
| 8,122,022 | B1 | * | 2/2012 | Baker ............................ | 707/736 |
| 8,171,403 | B2 | * | 5/2012 | Flint et al. ...................... | 715/261 |
| 2003/0139921 | A1 | * | 7/2003 | Byrd et al. ....................... | 704/10 |
| 2005/0114130 | A1 | * | 5/2005 | Java et al. ...................... | 704/240 |
| 2007/0220037 | A1 | * | 9/2007 | Srivastava et al. ............. | 707/102 |
| 2009/0006359 | A1 | * | 1/2009 | Liao .................................. | 707/5 |
| 2012/0109974 | A1 | * | 5/2012 | Feng et al. ..................... | 707/748 |

OTHER PUBLICATIONS

Gravano, L., et al., "Using q-grams in a DBMS for Approximate String Processing," IEEE Data Engineering Bulletin, vol. 24, No. 4, pp. 28-34, Dec. 2001.
Hodge, V., et al., "An Evaluation of Phonetic Spell Checkers," Mechanisms of Radiation Eflects in Electronic Materials, University of York, Dept. of Computer Science, 2001.
Larkey, L.S., "Acrophile: An Automated Acronym Extractor and Server," Proc. of 5th Acm Conf. on Digital Libraries, pp. 205-214, 2000.
Navarro, G., "A Guided Tour to Approximate String Matching," ACM Computing Surveys (CSUR), vol. 33, No. 1, pp. 31-88, Mar. 2001.
Park, Y., et al., "Hybrid text mining for finding abbreviations and their definitions" Conf. on Empirical Methods in Natural Language Processing (EMNLP), Jun. 2001.
Schwartz, A.S., "A Simple Algorithm for Identifying Abbreviation Definitions in Biomedical Text," Proc. Pacific Symposium on Biocomputing, vol. 8, pp. 451-462, 2003.

* cited by examiner

Primary Examiner — Talivaldis Ivars Smits
Assistant Examiner — Shaun Roberts
(74) Attorney, Agent, or Firm — Joseph C. Polimeni; Edell, Shapiro & Finnan, LLC

(57) ABSTRACT

A list of reference terms can be provided. Text and the list of reference terms can be broken down into tokens. At least one candidate can be generated in the text for mapping to at least one of the reference terms. Characters of the candidate can be compared to characters of the reference term according to one or more mapping rules. A confidence value of the mapping can be generated based on the comparison of characters. Candidates can be ranked according to their confidence value.

20 Claims, 5 Drawing Sheets

TEXT ANALYSIS METHOD FOR FINDING ACRONYMS

CROSS-REFERENCE TO RELATED APPLICATIONS

This application claims the benefit of European Patent Application No. 08100479.8 filed 15 Jan. 2008, entitled "TEXT ANALYSIS METHOD", which is assigned to the assignee of the present application, and the teachings of which are hereby incorporated by reference in their entirety.

BACKGROUND

The present invention relates to a text analysis method, particularly for finding acronyms and variants of acronyms of reference terms in a text.

A very large proportion of all database contents are available in non-structured form, most of it in text form. The Internet, as the largest distributed text database, is assumed to have a capacity of approximately one billion static websites and approximately five hundred billion dynamically generated websites. The amount of the stored online data volume is estimated to be roughly one thousand Petabyte and is still increasing. Automated text mining methods to handle such an information load and to analyze the data are required.

Text mining generally refers to an automated process of extracting information from a text. Text mining typically involves the process of structuring the input text, deriving patterns within the structured data and, finally, evaluating and interpreting the output. Typical text mining objects include, for instance, categorization and clustering of text, extraction of concepts, production of taxonomies, sentiment analysis and the like.

Prior art methods can be applied to formal texts such as books, scientific publications, patent documents, well-managed web sites and the like, which use an accurate, formal language, to find acronyms of reference terms.

An acronym is an artificial word or sequence of letters which usually includes one or more characters of words of a word group, such as "IT" for "information technology". In formal texts, standard acronyms of compound terms are typically formed by using only initial characters. Such acronyms are usually introduced with a definition when used for the first time, which helps to identify them.

In contrast, acronyms in informal texts are frequently used without definition. One reason is that informal texts are provided for a closed group of people who typically share a common understanding of the content of the informal text so that definitions of acronyms are considered to be unnecessary. Moreover, in informal texts formation rules for building acronyms can be softened resulting in nonstandard acronyms which are variants of classical acronyms or which can even consist of a multitude of words used contextually for a nonstandard purpose.

Y. Park and R. J. Byrd describe a method for finding acronyms and their definition in "Hybrid Text Mining for Finding Abbreviations and Their Definitions", Proceedings of the 2001 Conference on Empirical Methods in Natural Language Processing, 2001. Acronyms and respective definitions are identified by using common use of rules for forming abbreviations, text markings and cue words. Candidates for acronyms are identified by heuristics such as "the initial character is either a letter or a cipher", "the potential abbreviation is at least two characters long", "the candidate includes at least one upper-case character", or "the candidate cannot be the initial word of a sentence." Additionally, the character string must not be a member of, for instance, an official dictionary, of a list of names or of a manually constructed list of stop words and the like.

Groups using informal texts can be, for instance, call center agents attending to service requests and answers related to product failures. Documents provided by such groups (call transcripts or summaries) are characterized by being prepared hastily and under time pressure. Informal texts are characterized by a high rate of typographical errors such as misspellings, typing faults, individual abbreviations, grammatically inaccurate or incomplete sentences in note form and the like.

Prior art text mining methods frequently fail to find acronyms or variants of acronyms of reference terms in such informal texts using an informal language. Prior art solutions require either an exact string matching between the acronym and the reference term or, if a fuzzy string matching is allowed, the stronger the variant deviates from the reference term, the higher the number of misfits there will be. When analyzing a text for acronyms and variants with major deviations from a classical acronym, in particular abbreviations, a user has to be involved. The user usually has to manually examine a subset of the text corpus to detect variants that differ from the reference terms by more than a minor spelling deviation and these variants found have to be collected in a list of known acronyms which is used for analyzing the text. The results have to be manually checked and probably refined. Thus, manual interaction of the user is necessary not only once but for every new text corpus because new authors may be using largely different ways of abbreviating the same terms.

SUMMARY OF THE INVENTION

One embodiment of the invention provides a text analysis method which allows a user to analyze texts with an informal language, particularly to find acronyms and variants of acronyms of reference terms in a text with a reduced necessity of human interaction during the analysis. The text analysis method can find acronyms and/or variants of acronyms of a reference term in a text. The method can provide a list of reference terms, break down the text and the list of reference terms into tokens, generate at least one candidate in the text for mapping to the reference term, compare characters of the candidate to characters of the reference term according to one or more mapping rules, generate a confidence value of the mapping based on the comparison of characters, and rank candidates according to their confidence value.

According to another embodiment of the invention, a program product is proposed that includes a computer useable medium including a computer readable program. The computer readable program when executed on a computer can cause the computer, in order to find variants of a reference term in a text, to: provide a list of reference terms, to break down the text and the list of reference terms into tokens, to generate at least one candidate in the text for mapping to the reference term, to compare characters of the candidate to characters of the reference term according to one or more mapping rules, to generate a confidence value of the mapping based on the comparison of characters, and to mark candidates according to their confidence values.

Another embodiment of the invention provides a respective computing system.

DETAILED DESCRIPTION

Figure 1:
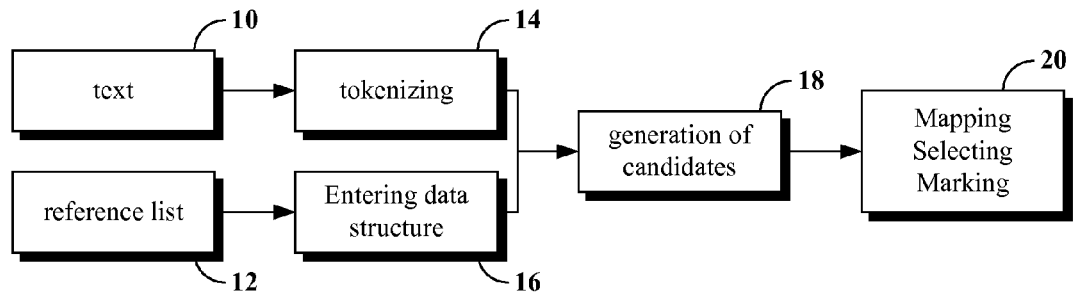
FIG. 1 is a flow chart depicting a text mining method according to the invention.

The drawings are merely schematic representations, not intended to portray specific parameters of the invention. The drawings are intended to depict only typical embodiments of the invention and therefore should not be considered as limiting the scope of the invention.

According to an embodiment of the invention to find acronyms (in a broad sense) of reference terms in a text, at least the following steps are performed: providing a list of reference terms, breaking down the text and the list of reference terms into tokens, generating at least one candidate in the text for mapping to at least one of the reference terms, comparing characters of the candidate to characters of the reference term according to one or more mapping rules, generating a confidence value of the mapping based on the comparison of characters, and ranking candidates according to their confidence values.

The confidence value can be determined depending on at least one of a relation of mapped and/or inaccessible characters, a relation of mapped and/or inaccessible tokens of the reference term, length difference of character strings of candidate and reference term. In one implementation, a quantity of characters of the candidate which map to characters of the reference term as well as the sequential order of the characters is determined, wherein the confidence value of the mapping is evaluated based on this number and order of characters.

Some basic definitions are discussed below. A text T and a reference term R consist each of a sequence of tokens. Each token $t_i^T$ and $t_i^R$ can be a sequence of two or more characters. The tokens $t_i^T$ and $t_i^R$ are separated from other tokens by at least one character of a set X whose members are not contained in any token (a token in general is referred to as $t_i$). In one embodiment, the reference term R is an entry in a list of reference terms.

The set X usually includes characters such as blank, paragraph marker, tabulator marker or punctuation characters such as !#$%&'( )++,-./:;<=>?@[\]^_{|}. Let N denote the set of the natural numbers.

The text T can be represented as $$T = t_1^T x_1 t_2^T x_2 \ldots x_k t_n^T, \text{ with } n, k \in N, n \geq 1 \text{ and } x_k \in X^*$$

The reference term R can be represented by $$T = t_1^R x_1 t_2^R x_2 \ldots x_r t_m^R, \text{ with } m, r \in N, m \geq 1 \text{ and } x_r \in X^*$$

where X* denotes the set of all finite sequences consisting only of characters of set X.

A sequence of tokens $t_i$ can also be represented without tags:

$$T = t_1^T t_2^T \ldots t_n^T = t_{1 \ldots n}^T, \text{ with } n \in N.$$

A token $t_i$ consists of a sequence of characters $c_i$ of an alphabet Σ, which has no elements in common with the set X $$t_i = c_1 c_2 \ldots c_p, \text{ with } p \in N, p \geq 1 \text{ and } c_p \in \Sigma$$

$$X \cap \Sigma = \{\}$$

To determine the length of a token a function LENGTH can be used:

$$\text{LENGTH}: \Sigma^* \to N, \text{ if } t_i = c_1 c_2 \ldots c_p, \text{ with } p \geq 1, \text{ then } \text{LENGTH}(t_i) = p$$

where Σ* denotes the set of all finite sequences consisting only of characters of set Σ.

The length of the text T and the reference term R can be determined from the number of the characters contained and is accordingly referred to as LENGTH(T) and LENGTH(R). To address a single character $c_p$ within a token $t_i$, a notation $t_{i,p}$ is used. For instance, the fourth character $c_4$ in the third token $t_3^R$ of the reference term R can be referred to as $t_{3,4}^R$.

In a first embodiment, an acronym A in a general broad sense consists of one or more tokens $t_i^A$. A definition D potentially corresponding to the acronym A is built from one or more tokens $t_j^D$:

$$A = t_{1 \ldots i}^A \text{ with } i \geq 1$$

$$D = t_{1 \ldots j}^D \text{ with } j \geq 1$$

The definition D can be denoted as reference term R which has been elucidated above. The acronym A is an acronym in a general broad sense with respect to the definition D if there is a mapping f: N→N of each character $A_x$ of the acronym A to a character Dy of the definition D with f(x)=y and x=1 ... LENGTH(A) as well as y=1 ... LENGTH(D) so that the following conditions are fulfilled:

Condition 1: mapping with equal sequences of the characters

For all characters of the acronym A:

if a mapping f(x)=y exists and a mapping f(x+1)=k, then y<k.

Condition 2: conformity of token

The initial character of the acronym A is mapping to the initial character of the definition D, so that f(1)=1.

Further, the initial character of a token $t_i^A$ of the acronym A is mapping to the initial character of a token $t_i^D$ of the definition D.

Additionally, for each initial character of a token $t_j^D$ of the definition $D_y$, there exists a character $A_x$ of the acronym A so that f(x)=y. As a result, a token $t_j^D$ of the definition D cannot be skipped by the mapping.

The expression "acronym" should be understood as an acronym in a broad sense, comprising besides standard acronyms also acronyms in a broader sense and abbreviations of a definition D which are not necessarily formed the same as classical acronyms but are meant to represent the definition D.

During mapping of such a probable acronym (also referred to as candidate) to a given definition D, the strict definition of an acronym in a general broad sense can be softened as follows:

1. Mapping of characters of the candidate—Characters of the acronym can be skipped in each token of the acronym up to a given error count ε. However, the initial character of the token cannot be skipped. The initial character of the token $t_i^A$ always has to match the initial character of the definition D.

2. Skipping of token $t_j^D$ of the definition D—The mapping to a definition D (i.e., reference term R) can start with a token following after the initial token (i.e., it is possible to skip an initial contiguous sequence of tokens of the definition D at the beginning of the definition D). Further, depending on the circumstances, more tokens of the sequence of tokens of the definition D can be skipped if forming numbers, stop words or copulas.

3. Skipping of token $t_i^A$ of the acronym A—While mapping an acronym to a given definition D, it is possible to skip one or more tokens of the acronym if they form numbers, stop words or copulas.

In one embodiment, the definition D can also be denoted as a reference term R if the reference term R is represented by the acronym. The acronym is to be understood as any abbreviation representing the reference term.

By using a matching index $f_{ADM}$, parts of a text can be identified as acronyms and assigned to a reference term, also called candidate generation. These acronyms A are referred to as candidates. The matching index defined as $f_{ADM}$:

$\Sigma^* \times \Sigma^* \to [0,1]$ determines the maximum accessible quality of the mapping of an acronym candidate to a given definition D, wherein for all $S \in \Sigma^* f_{ADM}(S,S)=1$. This function is monotonously increasing with increasing mapping quality. The matching index $f_{ADM}$ is not a similarity function as known in the art, because a symmetry between different parameters of a given set of reference terms R is not necessarily given (e.g., "WAS" is an acronym for the reference term "Websphere Application Server" but not vice versa).

For a given text T and a reference term R all sequences of text tokens $t_{i \ldots j}^T$ are wanted so that the matching index $f_{ADM}$ can be equal or greater than a threshold $\delta$. Referring to a sequence of tokens $t_{i \ldots j}^T$ as variant $V_{i \ldots j}$, then $R_v = t_{1 \ldots m}^{R_v}, m \geq 1, v=1 \ldots s$ $T = t_{1 \ldots n}^T, n \geq m$ $f_{ADM}(V_{i \ldots j}, R_v) \geq \delta, i \geq 1$ and $j \leq n$.

A variant (acronym A) can be mapped to a multitude of reference terms R. By using this matching index $f_{ADM}$ it is no longer necessary to add acronyms and variants of reference terms to a list of reference terms in order to find these acronyms and variants in a given text.

In order to analyze a text and find variants of specific reference terms, tasks can include: generating a list of reference terms, generating candidates (e.g., finding probable acronyms and variants), and identifying and evaluating the mapping of the candidate to one or more reference terms.

As a visualization of the invention, FIG. 1 depicts process steps of a method for finding true acronyms and variants of true acronyms, henceforth denoted as acronyms.

In step 10 a text and in step 12 a reference list are imported. The text and the reference list are broken down into tokens in step 14. In step 16, a data structure of the reference term list is established. Step 18 provides the generation of candidates. In step 20 the candidates are mapped to the respective reference terms. Optionally, the candidates can be selected according to a confidence value which is based on the mapping result and, reasonably, the selected candidates with a high confidence value can be marked accordingly.

For an efficient determination of a probable multitude of acronyms and variants of acronyms of specific reference terms, it is reasonable to transform the list of reference terms into an appropriate data structure (step 16). This data structure can be a simple data structure, where each token is stored separately, or it can be a compressed data structure, where similarities of the terms included in the reference terms are utilized, such as a common prefix, common suffix and/or common subsequence.

Before the mapping step, the candidate for an acronym and/or a variant of an acronym (e.g., acronym in a broad sense) has to be selected from the set of available tokens in the text. The quality of finding the candidates depends on a specific selection function applied. Thus, in step 18, generation of candidates can be done either by using a simple filter function or a special filter function. A simple filter function is to utilize every token of the text as a possible candidate which has at least a length of two characters and is not a number. Additionally, for each reference term it can be checked if the initial character of the candidate token is a member of the set of initial characters of tokens of the reference term. If yes, the mapping function for the next step (20) for a sequence of tokens from the text to the respective reference term can be determined.

To narrow down the number of probable candidates and reduce the process time, the candidates can be checked out if an accessible subsequence of token of the reference term (definition) corresponds to a specified quality value in form of the matching index $f_{ADM}$. Only candidates which meet at least the predetermined matching index $f_{ADM}$ are utilized for mapping.

A further reduction of process time can be achieved if the number of comparisons with the reference list can be reduced (e.g., by utilizing a compressed data structure). In this case, the number of comparisons per candidate can be limited to reference terms with different prefixes. Further it is possible to utilize the so-called "POS-Tagging" to reduce the number of candidates. POS-Tagging (Part-of-Speech Tagging) is known in the art and means grammatically marking (tagging) each word of a sentence. POS-Tagging is suitable for more formal texts with a reliable syntax and only minor errors. Rule-based or stochastic algorithms (taggers) can be employed for detecting the part of speech. Such algorithms are known in the art (see, E. Brill, "A simple rule-based part-of-speech tagger", Proceedings of ANLP-92, $3^{rd}$ Conference on Applied Natural Language Processing, pp. 152-155, 1992).

For each possible candidate-definition pair the matching index $f_{ADM}$ has to be determined. Finally, each candidate that has a quality above the threshold $\delta$ specified has to be marked as an acronym or a variant of an acronym.

In the simplest case each token of a text can be compared with each token of the reference term for mapping.

Figure 2:
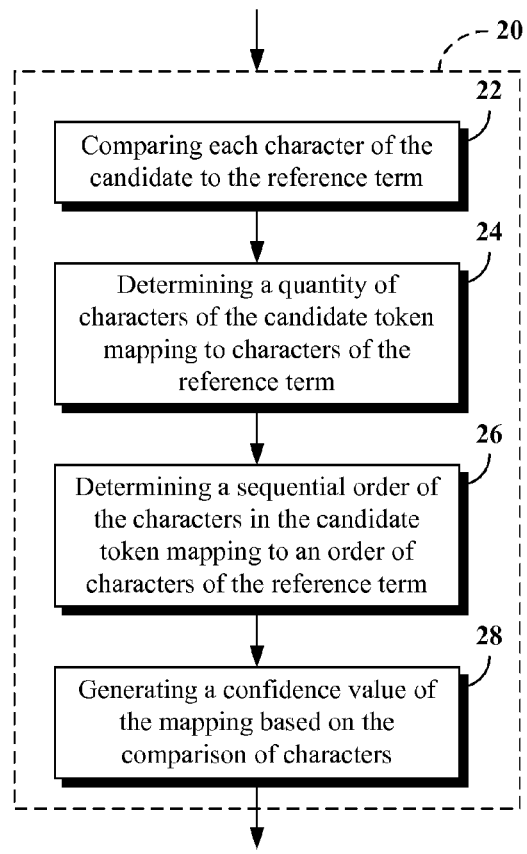
FIG. 2 illustrates process steps to determine a confidence value.

FIG. 2 depicts a set of steps to determine an appropriate confidence value (step 20 of FIG. 1). In the optional step 22, each character of the candidate is compared to the reference term. In the optional step 24, a quantity of characters of the candidate is determined which maps to the characters of the reference term. In the optional step 26, a sequential order of the characters on the candidate is determined which maps to the order of characters of the reference term. In the optional step 28, the confidence value is generated based on a comparison of the characters (i.e., based on the number determined in step 24 and the number determined in step 26).

In one embodiment, a confidence value for estimating the quality of mapping a candidate to a reference term can be computed as:

$$scoreA = \frac{\text{mapped characters}}{\text{all characters of acronym}} \times \frac{\text{sum of the length of all reached token of reference term}}{\text{sum of the length of all token of reference term}}$$

The acronym "WAS" for the reference term "Websphere Application Server" receives a $$scoreA = \frac{3}{3} \times \frac{26}{26} = 1.$$

The acronym "WebSphere Application Srv" receives a $$scoreA = \frac{22}{23} \times \frac{26}{26} = 0.96$$

when mapped to "Websphere Application Server". The acronym "WebAppSrv" receives a scoreA=1. ScoreA cannot distinguish between the acronym variants "WAS" and "WebAppSrv". A more detailed confidence value can be achieved if the lengths of the involved character strings are considered. A parameter $\alpha$ is introduced as an empirical value, wherein $\alpha \in [0,1]$ which weighs a fraction of scoreA:

$$scoreB = \alpha \times scoreA + (1 - \alpha) \times \frac{\text{mapped characters of acronym}}{\text{sum of all token of reference term}}$$

As a rule of thumb, $\alpha=0.95$ is considered a reasonable value, as the fraction of scoreA of the result is 95%. 5% are utilized to consider the ratio of the lengths of the character strings. The larger the value of $\alpha$ is, the lower is the weight of the ratio of the character strings involved. Now scoreB=0.96 for "WAS" and scoreB=0.97 for "WebAppSrv", yielding a distinction between the acronyms. The higher value for "WebAppSrv" considers the higher probability for "WebAppSrv" to be an acronym because of the higher number of matching characters. "WAS" can easily be an acronym for another reference term. Accordingly scoreB=0.95 for "WebSphere Application Srv". Alternatively or additionally, for distinguishing between the different mappings, distances of the mapped characters and/or a fraction of the involved characters in the reference term can be considered.

Figure 3:
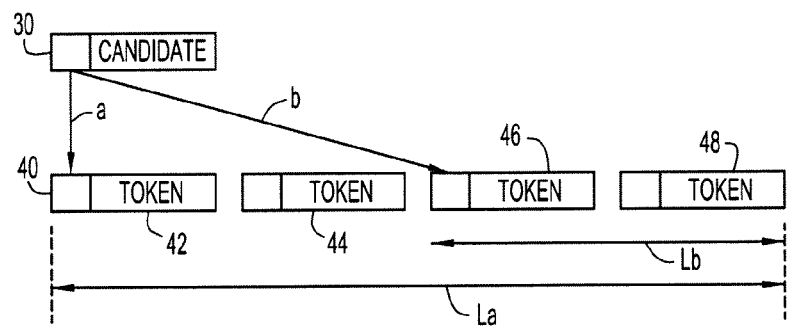
FIG. 3 is an example of candidate generation with different matching indices.

As mentioned above, the generation of candidates can be performed by using one or more appropriate filter functions. With better candidate generation the determination of potential mappings becomes more runtime and cost efficient. The step of candidate generation must be performed for each text token and should be as fast as possible. An example for the generation of candidates is depicted in FIG. 3 which allows improving the efficiency of the procedure. One filter rule could be for example to refuse a candidate if the first token reached in the reference term does not permit a matching index $f_{ADM}$ of more than some limit, which may be defined by the user.

To exemplify this, a candidate 30 is compared to a reference term 40, consisting of tokens 42, 44, 46 and 48. If the initial character of candidate 30 matches the initial character of the first token 42 of the reference term 40 (arrow a) the maximal reachable parts of the reference term 40 include all the tokens 42, 44, 46, and 48 of the reference term 40, indicated by a length La. If the initial character of the candidate 30 does not match the initial characters of the first and second tokens 42 and 44 of the reference term 40 but, for instance, of the third token 46 (arrow b), the maximal reachable part of the reference term 40 is smaller and includes in this example only the two tokens 46 and 48 of the four, indicated by a length Lb, which is only half of the length La. Because the maximal reachable parts of the reference term 40 are not more than 50% in the latter case, the matching index $f_{ADM}$ is lower for the latter case than for the first case. Assuming a simple mapped-to word ratio scoring and not permitting typing errors in the first position, after the first character is matched, $f_{ADM}$ cannot be higher than 0.5 given the explained circumstances. If further mismatches appear, the score will still be lower. However, as long as the matching index is higher than a given threshold (score) for the matching index $f_{ADM}$, in both cases would yield a valid candidate 30 for the reference term 40.

In one embodiment, the candidate can be generated by filtering tokens of the text according to at least one filter rule, which may be one or more of: length of one or more tokens, type of one or more tokens, initial character of one or more tokens, use of upper and/or lower case, only special areas of the text, matching of the initial character of the token with at least one initial character of the reference term, determination of a number of accessible tokens of a reference term per token, determination of an amount of initial characters of the reference term in the token, and meeting a given minimum quality score for one or more reference terms. One or more candidates out of a multitude of candidates can be selected according to their matching index and used for the mapping.

An appropriate data structure of reference terms can include the necessary data of the particular reference terms. These can be stored separately (simple representation) or the reference terms can be analyzed and combined in common groups. Thus, with a single access, a plurality of reference terms can be checked (compressed representation).

Various compressed representations are depicted in FIGS. 4a through 4d. By way of example, the reference terms in the reference term list are the software names WEBSPHERE Application Server, WEBSPHERE Application Server Express, WEBSPHERE Application Server Network Deployment, WEBSPHERE Portal Server, IBM WEBSPHERE Portal Server, IBM Network Application, and Portal Application. The disclosure is not to be construed as limited to these software products, which are presented for illustrative purposes only.

Figure 4A:
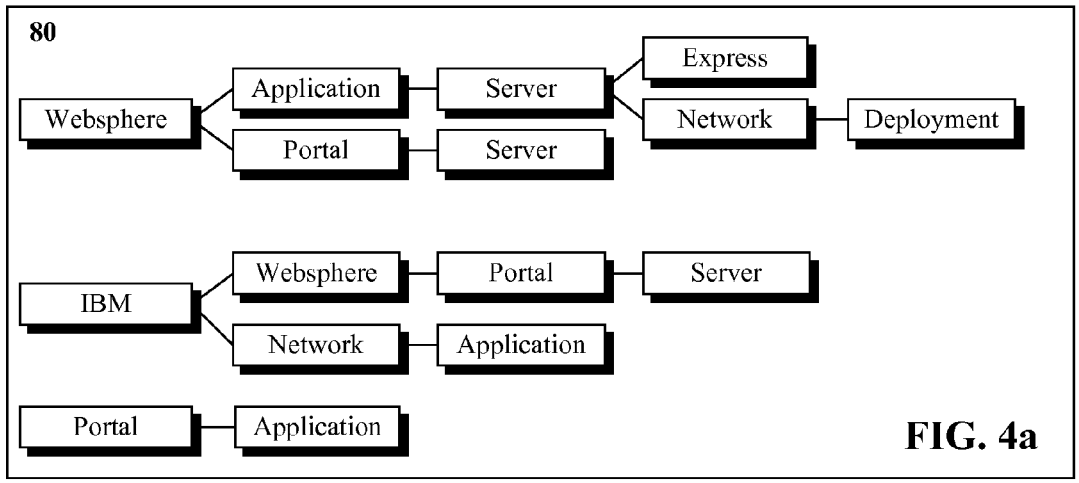
FIGS. 4a-d are examples for compressed representations of a multitude of reference terms.
Figure 4B:
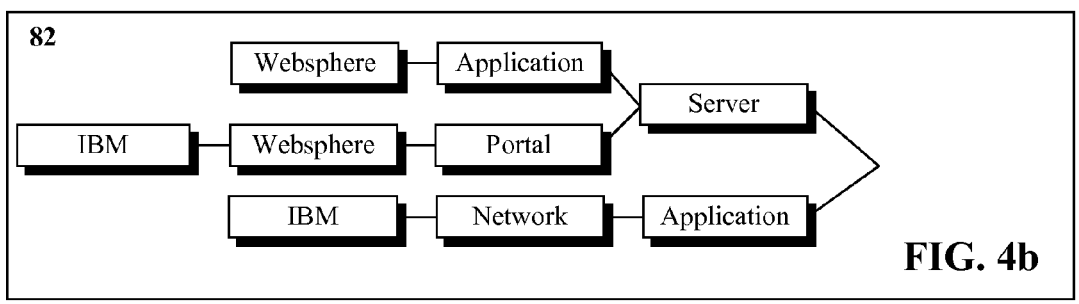
Figure 4C:
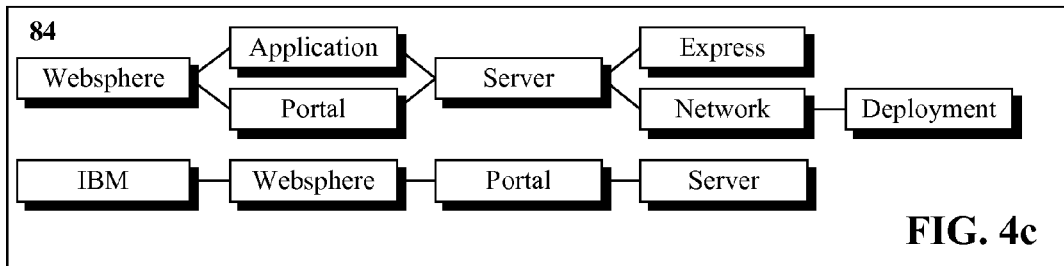
Figure 4D:
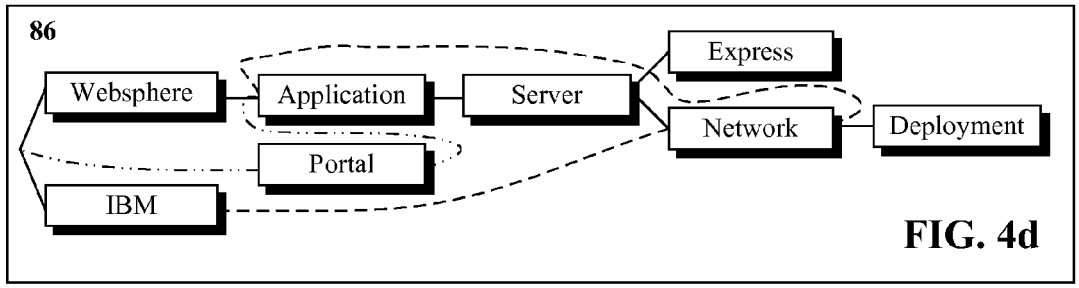

The reference terms 80 in FIG. 4a are combined according to their prefixes. The reference terms 82 in FIG. 4b are combined according to their suffixes. The reference terms 84 in FIG. 4c are combined according to the positions of the tokens in the reference term. The reference terms 86 in FIG. 4d are combined according to common tokens. The tokens in the reference terms 80, 82, 84, and 86 are connected by appropriate paths. In a graph structure, parts of the reference terms can be shared. For tree structures such as those in FIGS. 4a-4c, only the beginnings of the reference terms are shared. In a general graph structure similar to that depicted in FIG. 4d, each token occurs only once, which requires a more complex structure to manage the mapping of tokens. To realize terms such as "Websphere Application Server" each token of the structure can be asked if this is the end of a reference term, otherwise the next pointer points to the following token only.

The graph structure leads to a favorable speed-up because not all reference terms may have to be fully investigated.

For subsequently determining the matching index $f_{ADM}$, an appropriate representation is chosen which enables to check the single reference terms in the list at the same time. In one embodiment, the checking of the mapping of a probable acronym depends, according to the definition of acronyms in a broad sense, on the sequential order of the characters. With the compressed representation of the data structure it is possible to reduce the necessary computations of matching indices $f_{ADM}$ to terms for each potential token. In an ideal case, only one computation per token is necessary, independent of the number of terms in the reference list. For such a computation, a representation compared to FIG. 4d is possible. If the effort for determining the paths between the token is too high, as the following paths have to be worked depending in the input paths, a data structure considering common prefixes can be appropriate as relatively few operations are necessary to determine the valid paths between the token with a similar density of compression. Such a representation is particularly favorable for an online search for acronyms. If q-grams instead of tokens are used the compression of the data structure can be further increased. Q-grams are substrings of length q. Q-grams can be generated by drawing a window of size q over the characters of a string. In order to provide all q-grams with equal length, particularly initial and final characters, prefix and suffix with length q-1 are extended with characters (e.g., #), which are not members of the alphabet used.

Q-grams are known in the art, which are one contemplated implementation mechanism, as evidenced by L. Gravano, et al., "Using q-grams in a DBMS for approximate string processing", IEEE Data Engineering bulletin, 24(4), pp. 28-34, 2001, and other published documents.

Figure 5:
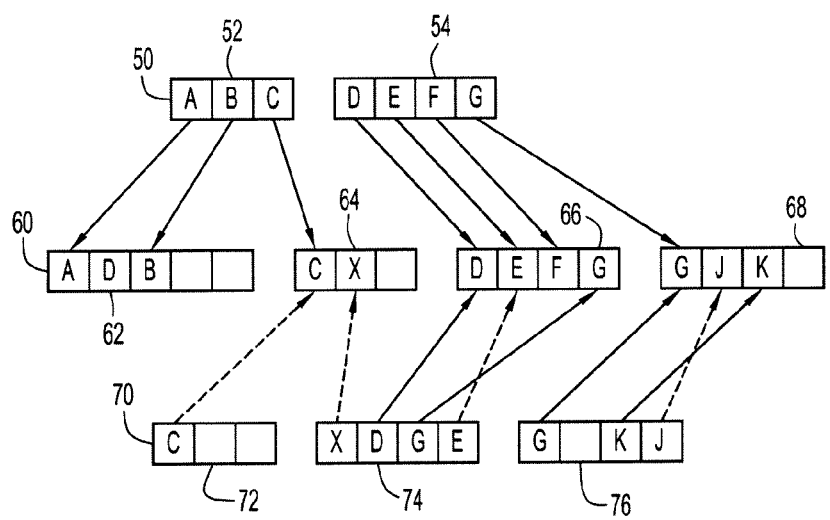
FIG. 5 is an example of mapping candidates to a reference term.

FIG. 5 elucidates mapping of a valid candidate 50—consisting of two tokens 52 and 54—and an invalid candidate 70—consisting of three tokens 72, 74 and 76—for an acronym to a reference term 60 comprising four tokens 62, 64, 66 and 68. By way of example, mapping rules require that the first major term of the reference term (60) must be matched, the initial characters of a candidate 50 or 70 must match to an initial character of the reference term 60 and the characters of the candidate 50, 70 must match in the sequential order of the reference term 60.

The tokens 52 and 54 of the valid candidate 50 include the characters A, B, C and D, E, F, G, respectively. The invalid candidate 70 consists of the character C in the first token 72, X, D, G, E in token 74 and G, K, J in token 76. The reference term 60 reads A, D, B in token 62, C, X in token 64, D, E, F, G in token 66 and G, J, K in token 68. The candidate 50 is a valid abbreviation of the reference term 60 as every character of the candidate 50 is mapped to the reference term 60 in the sequential order of the reference term 60. A and B of token 52 map to A and B of token 62, C of token 52 maps to C of token 64, D, E, F of token 54 map to D, E, F of token 66, and G of token 54 maps to G of token 68. The reference term characters D, X, G (of token 66) and J, K are not present in the candidate 50. The candidate 70 is considered invalid as the first major token 72 of the reference term 60 is not matched, as the first candidate token 72 starts with C and not with A. Further, the initial character of token 74 is X and not C, so that not all initial characters of the candidate 70 match initial characters of the reference term 60. Finally, the matches for characters G and E of token 74 and K and J of token 76 do not match in the proper order, thus violating the above-mentioned exemplary mapping rules. For other mapping problems, the mapping rules can be different.

Figure 6:
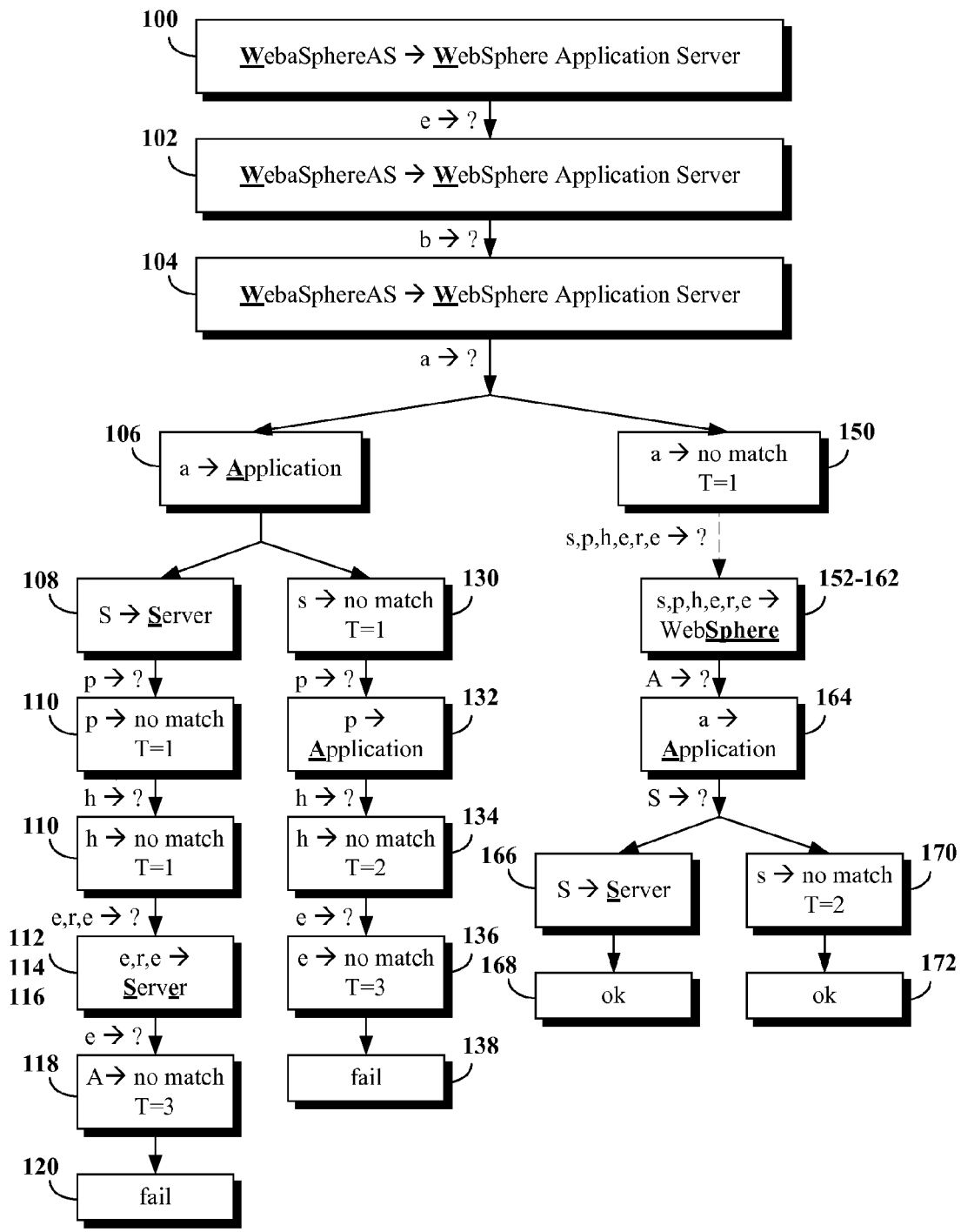
FIG. 6 is an example of a mapping tree for mapping of an acronym to a reference term.

FIG. 6 depicts by way of example a mapping tree for mapping a candidate WebaSphereAS to a reference term Websphere Application Server. As a mapping rule, the initial characters of the reference term have to be mapped as well as the sequential order of the characters has to be satisfied. Additionally, an error count of $\tau=2$ is defined. As long as there are not more than two errors in the mapping path, the mapping is accepted.

In step 100 the initial character W of the candidate maps to the initial character 'W' of the reference term. In step 102 the next character 'e' is mapped to the second character 'e' of the reference term. A mapping to another equal character 'e' (7. character or 9. character, etc.) is not considered, as the second character of the reference term has been mapped to. In step 104, the third character 'b' is mapped to the third character of the reference term. The fourth character of the candidate is an 'a' (WebaSphere). There is no 'a' following "Web", instead, the next character of the reference term is 'S'. The next matching character 'a' of the reference term is the initial character of the second token "Application". There are two possibilities. In step 106 character 'a' is mapped to 'a' of "Application" and in step 150, there is no match for character 'a' and the error count is set to $\tau=1$.

Following now the first branch subsequent to step 106, the next character to map is 'S' (WebaSphere). In this branch, the error count is still $\tau=0$. Again, there are two possibilities for 'S' in step 108, 'S' is mapped to 'S' of "Server". In step 130, there is no match for 'S' and the error count is set to $\tau=1$.

Following the step 108 with $\tau=0$, the next character to map is 'p' (WebaSphere). As 'S' was mapped to the initial character of the last token "Server" of the reference term, there is no match for 'p' in step 110 and the error count is set to $\tau=1$. The next character to map is 'h' (WebaSphere), and there is no match to 'h' in "Server" in step 110. The error count is set to $\tau=2$. In steps 112, 114, 116, characters 'e', 'r', and 'e' are successfully mapped to "Server". In step 118, character 'A' has to be mapped (WebaSphereAS), but no match is found in the last token "Server" of the reference term. Thus, the error count is exceeding the limit of $\tau=2$ and this mapping branch is decided to "fail" in step 120.

Now the branch following step 130 is investigated further. As 's' could not be mapped, the error count was already set to $\tau=1$. In step 132, character 'p' has to be mapped (WebaSphereAS) which can be done with character 'p' of the second token "Application." Next, character 'h' has to be mapped (WebaSphereAS). There is no match for character 'h' in step 132, and the error count is set to $\tau=2$. As the next character 'e' has to be mapped (WebaSphereAS). However, as the initial character of "Server" has not been matched, the mapping rule is violated and the error count is set to $\tau=3$ in step 136 and "fail" is decided in step 138.

Both branches where character 'a' was mapped have exceeded the maximum error count and failed. Going back to the branching point and step 150, where 'a' was not matched and the error count was set to $\tau=1$, the next characters 's', 'p', 'h', 'e', 'r', and 'e' (WebaSphereAS) can be successfully mapped in steps 152 through 162. In step 164, character 'A' (WebaSphereAS) can be mapped to the second token "Application" of the reference term. The last character 's' of the candidate can be mapped to "Server" in step 166, resulting in a successful mapping to the reference term in step 168. However, even if 'S' is considered no match in step 170, the error count is set to $\tau=2$ which is still tolerated and the mapping is successful in step 172 even for this case. As a result, "WebaSphereAS" can be mapped to "WEBSPHERE Application Server" although it is not a classical acronym of the reference term. The classical acronym WAS would be built of the initial characters of the reference term.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or any other propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

Figure 7:
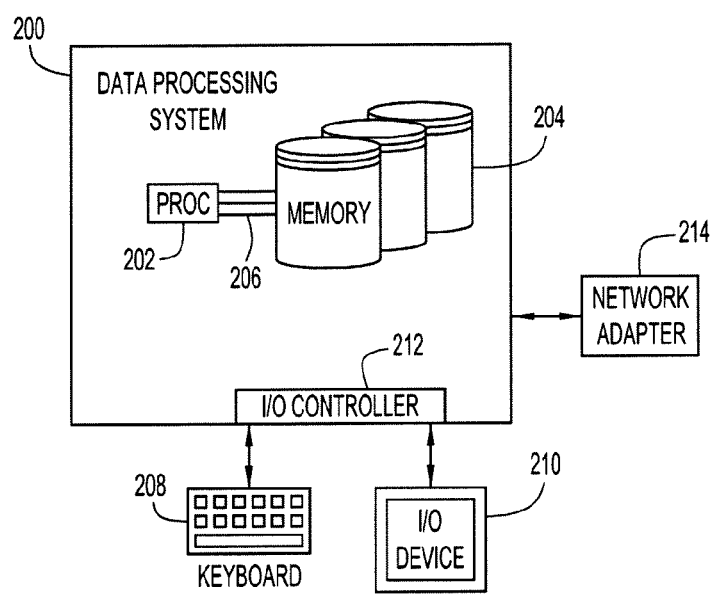
FIG. 7 is a data processing system for performing a text analysis method.

A data processing system 200 as schematically depicted in FIG. 7 suitable for storing and/or executing program code will include at least one processor 202 coupled directly or indirectly to memory elements 204 through a system bus 206. The memory elements 204 can include local memory employed during actual execution of the program code, bulk storage, and cache memories which provide temporary storage of at least some program code in order to reduce the number of times code must be retrieved from bulk storage during execution.

Input/output or I/O-devices 208, 210 (including, but not limited to keyboards, displays, pointing devices, etc.) can be coupled to the system 200 either directly or through intervening I/O controllers 212.

Network adapters 214 may also be coupled to the system 200 to enable the data processing system or remote printers or storage devices through intervening private or public networks. Modems, cable modems and Ethernet cards are just a few of the currently available types of network adapters.

In the data processing system 200, the described method for finding acronyms of reference terms in a text can be performed. The processor 202 can be provided for reading in text and a list of reference terms, filter rules and mapping rules from (e.g., an internal memory element 204). The internal memory element 204 may also provide a predetermined matching index for candidate generation. The text and the list of reference terms are broken down into tokens. At least one candidate for mapping to the reference term is generated in the text and stored in the internal memory element 204. Characters of the candidate are compared to characters of the reference term according to one or more mapping rules. A confidence value of the mapping is generated based on the comparison of characters and candidates are marked according to their confidence value. The candidates found can be stored in the internal memory elements 204, together with their respective confidence values. Alternatively, external memory elements can be coupled to the system 200 and the processor 202, respectively.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A computer implemented text analysis method for finding acronyms of a reference term in a text, comprising:
   providing a list of reference terms;
   breaking down text and a list of reference terms into tokens;
   generating at least one acronym candidate in the text for mapping to at least one of the reference terms;
   comparing characters of the acronym candidate to characters of the reference term according to one or more mapping rules;
   generating a confidence value of the mapping based on said comparison of characters; and
   ranking acronym candidates according to their confidence value.

2. The method according to claim 1, further comprising:
   determining the confidence value depending on at least one of:
   a relation of at least one of mapped and inaccessible characters; a relation of at least one of mapped and inaccessible tokens of the reference term; and
   length difference of character strings of acronym candidate and reference term.

3. The method according to claim 1, further comprising:
   determining a number of characters of the acronym candidate which map to characters of the reference term;
   determining an order of the characters in the acronym candidate which map to characters of the reference term; and
   determining the confidence value of the mapping based on said number and order of characters.

4. The method according to claim 1, further comprising:
   generating at least one acronym candidate by filtering tokens of the text according to at least one filter rule.

5. The method according to claim 4, said generating at least one acronym candidate based upon at least one of:
   length of one or more tokens;
   type of one or more tokens;
   initial character of one or more tokens;
   use of upper and/or lower case;
   only selected areas of the text;
   matching of the initial character of the token with at least one initial character of the reference term;
   determination of a number of accessible tokens of a reference term per token;
   determination of an amount of initial characters of the reference term in the tokens; and
   meeting a given minimum matching index for one or more reference terms.

6. The method according to claim 1, further comprising:
   selecting one or more acronym candidates for mapping out of a multitude of acronym candidates according to their matching index.

7. The method according to claim 1, further comprising:
   determining that mapping of at least one acronym candidate is successful if it is not exceeding a predetermined error count and rejecting an acronym candidate that is exceeding the predetermined error count.

8. The method according to claim 1, further comprising:
   analyzing the mapping of the at least one acronym candidate to at least one reference term based on one or more mapping rules.

9. The method according to claim 8, further comprising:
defining one or more mapping rules encompassing at least one of:
- each initial character of one or more token of the acronym candidates has to match;
- characters have to occur in the same sequential order in acronym candidate and corresponding reference term;
- all tokens in an acronym candidate have to match;
- no token inside an acronym candidate can be skipped; and
- one or more single characters of a token of an acronym candidate can be skipped.

10. The method according to claim 9, further comprising: increasing the error count for each character skipped.

11. The method according to claim 1, further comprising: storing separately each reference term amongst a multitude of reference terms.

12. The method according to claim 1, further comprising: combining reference terms in a reference term list by common groups contained in the reference terms.

13. A computer program product comprising a computer useable storage device having a computer readable program, wherein the computer readable program when executed on a computer causes the computer to:
- provide a list of reference terms;
- break down text and a list of reference terms into tokens;
- generate at least one acronym candidate in the text for mapping to at least one of the reference terms;
- compare characters of the acronym candidate to characters of the reference term according to one or more mapping rules;
- generate a confidence value of the mapping based on said comparison of characters; and
- rank acronym candidates according to their confidence value.

14. The computer program product of claim 13, wherein the computer readable program when executed on a computer further causes the computer to:
- determine a number of characters of the acronym candidate which map to characters of the reference term;
- determine an order of the characters in the acronym candidate which map to characters of the reference term; and
- determine the confidence value of the mapping based on said number and order of characters.

15. The computer program product of claim 13, wherein the computer readable program when executed on a computer further causes the computer to:
- determine that mapping of at least one acronym candidate is successful if it is not exceeding a predetermined error count and rejecting an acronym candidate that is exceeding the predetermined error count.

16. The computer program product of claim 13, wherein the computer readable program when executed on a computer further causes the computer to:
- analyze the mapping of the at least one acronym candidate to at least one reference term based on one or more mapping rules; and
- increase the error count for each character skipped, wherein said mapping rules comprise at least one of:
  - each initial character of one or more token of the acronym candidates has to match;
  - characters have to occur in the same sequential order in acronym candidate and corresponding reference term;
  - all tokens in an acronym candidate have to match;
  - no token inside an acronym candidate can be skipped; and
  - one or more single characters of a token of an acronym candidate can be skipped.

17. A computing system for finding variants of a reference term in a text, wherein said computing system is configured to:
- provide a list of reference terms;
- break down text and a list of reference terms into tokens;
- generate at least one acronym candidate in the text for mapping to at least one of the reference terms;
- compare characters of the acronym candidate to characters of the reference term according to one or more mapping rules;
- generate a confidence value of the mapping based on said comparison of characters; and
- rank acronym candidates according to their confidence values.

18. The computing system of claim 17, wherein said computing system is further configured to:
- determine a number of characters of the acronym candidate which map to characters of the reference term;
- determine an order of the characters in the acronym candidate which map to characters of the reference term; and
- determine the confidence value of the mapping based on said number and order of characters.

19. The computing system of claim 17, wherein said computing system is further configured to:
- determine that mapping of at least one acronym candidate is successful if it is not exceeding a predetermined error count and rejecting an acronym candidate that is exceeding the predetermined error count.

20. The computing system of claim 17, wherein said computing system is further configured to:
- analyze the mapping of the at least one acronym candidate to at least one reference term based on one or more mapping rules; and
- increase the error count for each character skipped, wherein said mapping rules comprise at least one of:
  - each initial character of one or more token of the acronym candidates has to match; characters have to occur in the same sequential order in acronym candidate and corresponding reference term;
  - all tokens in an acronym candidate have to match;
  - no token inside an acronym candidate can be skipped; and
  - one or more single characters of a token of an acronym candidate can be skipped.

* * * * *